United States Patent
Tsuchiya (10) Patent No.: US 11,938,580 B2
(45) Date of Patent: Mar. 26, 2024

(54) WORKPIECE MACHINING METHOD AND WORKPIECE MACHINING DEVICE

(71) Applicant: Shibaura Machine Co., Ltd., Tokyo (JP)

(72) Inventor: Koji Tsuchiya, Shizuoka (JP)

(73) Assignee: Shibaura Machine Co., Ltd., Tokyo (JP)

(*) Notice: Subject to any disclaimer, the term of this patent is extended or adjusted under 35 U.S.C. 154(b) by 342 days.

(21) Appl. No.: 17/525,425

(22) Filed: Nov. 12, 2021

(65) Prior Publication Data
US 2022/0063040 A1  Mar. 3, 2022

Related U.S. Application Data

(63) Continuation of application No. PCT/JP2020/017460, filed on Apr. 23, 2020.

(30) Foreign Application Priority Data

May 13, 2019 (JP) .................................. 2019-090654
Mar. 5, 2020 (JP) .................................. 2020-037612

(51) Int. Cl.
*B23Q 15/22* (2006.01)
*B23C 5/10* (2006.01)
(Continued)

(52) U.S. Cl.
CPC ................ *B23Q 15/22* (2013.01); *B23C 5/10* (2013.01); *G05B 19/402* (2013.01); *G05B 19/4099* (2013.01)

(58) Field of Classification Search
CPC ...... B23Q 15/22; B23Q 17/22; G05B 19/402; G05B 19/404; G05B 19/40937;
(Continued)

(56) References Cited

U.S. PATENT DOCUMENTS

2003/0125829 A1* 7/2003 Kakino .............. G05B 19/4163
700/86
2008/0050184 A1* 2/2008 Glaesser .......... G05B 19/40937
407/53
(Continued)

FOREIGN PATENT DOCUMENTS

CN   205192434   4/2016
CN   106338965   1/2017
(Continued)

OTHER PUBLICATIONS

International Search Report dated Jul. 7, 2020 issued in PCT/JP2020/017460.
(Continued)

*Primary Examiner* — Kidest Bahta
(74) *Attorney, Agent, or Firm* — DLA Piper LLP (US)

(57) ABSTRACT

A workpiece machining device includes a positional deviation correction unit configured to correct a positional deviation of a radius end mill by detecting a positional deviation between a real contour line and an ideal contour line of the radius end mill. The positional deviation correction unit calculates a first correction value configured to make a center of a first arc section formed into an arc shape at a corner portion of the ideal contour line and a center of a second arc section formed into an arc shape at a corner portion of the real contour line to be identical to each other in a plane perpendicular to the rotational axis, and corrects a machining point by the radius end mill using the first correction value.

6 Claims, 8 Drawing Sheets

(51) Int. Cl.
*G05B 19/402* (2006.01)
*G05B 19/4099* (2006.01)

(58) Field of Classification Search
CPC ...... G05B 19/4099; G05B 2219/37228; G05B 2219/50285; G05B 2219/50293; G05B 2219/50334; Y02P 90/02; B23C 3/16; B23C 5/10; B23C 5/00; B23C 2245/00
See application file for complete search history.

(56) References Cited

U.S. PATENT DOCUMENTS

2015/0293519 A1* 10/2015 Maeda .................. G05B 19/19
 700/186
2021/0379719 A1 12/2021 Eto et al.

FOREIGN PATENT DOCUMENTS

| CN | 108803487 | 11/2018 |
|---|---|---|
| JP | S63-233403 | 9/1988 |
| JP | H 09-81221 | 3/1997 |
| JP | 2001-259966 | 9/2001 |
| JP | 2003-323204 | 11/2003 |
| JP | 2007-168013 | 7/2007 |
| JP | 2007-276036 | 10/2007 |
| JP | 2014-169961 | 9/2014 |
| WO | WO 2020/174853 | 9/2020 |

OTHER PUBLICATIONS

Written Opinion dated Jul. 7, 2020 issued in PCT/JP2020/017460.
Korean Office Action in Application No. 2020-037612, dated Feb. 13, 2023.
Chinese Office Action in Application No. 2020-8002969.1, dated Mar. 29, 2023.
Japanese Office Action in Application No. 2020-037612, dated Oct. 18, 2022.

* cited by examiner

WORKPIECE MACHINING METHOD AND WORKPIECE MACHINING DEVICE

CROSS-REFERENCE TO RELATED APPLICATIONS

The present application is a continuation of International Application No. PCT/JP2020/017460, filed on Apr. 23, 2020, and based upon and claims the benefit of priority from Japanese Patent Applications No. 2019-090654, filed on May 13, 2019, and No. 2020-037612, filed on Mar. 5, 2020, the entire contents of which are incorporated herein by reference.

TECHNICAL FIELD

The disclosure relates to a workpiece machining method and a workpiece machining device.

BACKGROUND ART

Conventionally, a workpiece machining device has been employed in which an end mill moves relative to a workpiece (a material to be machined) by using an NC program, and the end mill is rotated to perform cutting of the workpiece.

In such a machining device, the end mill is chucked and fixed to a tool holding unit such as a spindle, and the end mill moves relative to the workpiece to perform cutting of the workpiece. Therefore, when the end mill is fixed to the tool holding unit due to a defective chucking or the like, a positional deviation may occur. In addition, an initial shape error may occur in the end mill. In such a case, there arises a problem that the end mill cannot be moved to an accurate cutting position with respect to the workpiece, and high-precision cutting cannot be performed.

Further, PTL 1 (JP S63-233403 A) discloses that when a workpiece is machined using a ball end mill, the position of the ball end mill is corrected in consideration of deterioration of the ball end mill due to wear. That is, PTL 1 discloses that an error of a cutting surface is prevented by calculating a shape error by laser-scanning a tool shape which changes as cutting of the workpiece by the ball end mill advances, computing a correction amount of a tool position based on the calculated shape error, and correcting the tool position.

However, the technique disclosed in PTL 1 refers to correction of the deterioration of the end mill due to wear, but does not refer to correction of a shape error of the end mill or a mounting error thereof at the time of positioning. Further, PTL 1 illustrates an example of using a ball end mill (a tool having a hemispherical tip) as the end mill, but does not refer to correction of a radius end mill (a tool formed into an arc-shaped corner at a tip).

SUMMARY

As described above, in the conventional example disclosed in PTL 1, when a deviation occurs in an arc center at a corner portion formed into an arc shape of a radius end mill, this deviation cannot be corrected, thereby causing a problem that an error occurs on the cutting surface.

The present application has been made to solve such a conventional problem, and an object of the present application is to provide a workpiece machining method and a workpiece machining device capable of reducing cutting errors at the time of the workpiece machining by correcting an arc center of a radius end mill.

A workpiece machining method according to an embodiment is a method for machining a workpiece into a desired shape, and the method includes: holding a radius end mill in a tool holding unit, the radius end mill having a corner portion at a lower end formed into an arc shape in a side view and rotating about a rotation axis to perform cutting of the workpiece; detecting a positional deviation between a real contour line, which is a contour line of the radius end mill, and an ideal contour line, which is a contour line of the radius end mill formed into an ideal shape, when the radius end mill is held by the tool holding unit; calculating a first correction value configured to make a center of a first arc section formed into an arc shape at a corner portion of the ideal contour line and a center of a second arc section formed into an arc shape at a corner portion of the real contour line to be identical to each other in a plane perpendicular to the rotational axis; and correcting a machining point by the radial end mill using the first correction value when the cutting is performed.

A workpiece machining device according to an embodiment is a device for machining a workpiece into a desired shape, and the device includes: a radius end mill in which a corner portion of a lower end is formed into an arc shape in a side view and rotates about a rotation axis to perform cutting of the workpiece; a tool holding unit configured to hold the radius end mill; a positional deviation detection unit configured to detect a positional deviation between a real contour line, which is a contour line of the radius end mill, and an ideal contour line, which is a contour line of the radius end mill formed into an ideal shape, when the radius end mill is held by the tool holding unit; and a positional deviation correction unit configured to correct the positional deviation; wherein the positional deviation correction unit calculates a first correction value configured to make a center of a first arc section formed into an arc shape at a corner portion of the ideal contour line and a center of a second arc section formed into an arc shape at a corner portion of the real contour line to be identical to each other in a plane perpendicular to the rotational axis, and corrects a machining point by the radius end mill using the first correction value.

The embodiment makes it possible to reduce cutting errors at the time of workpiece machining by correcting the arc centers of the radius end mill.

DETAILED DESCRIPTION

[Description of Configuration of Embodiment]

Figure 1:
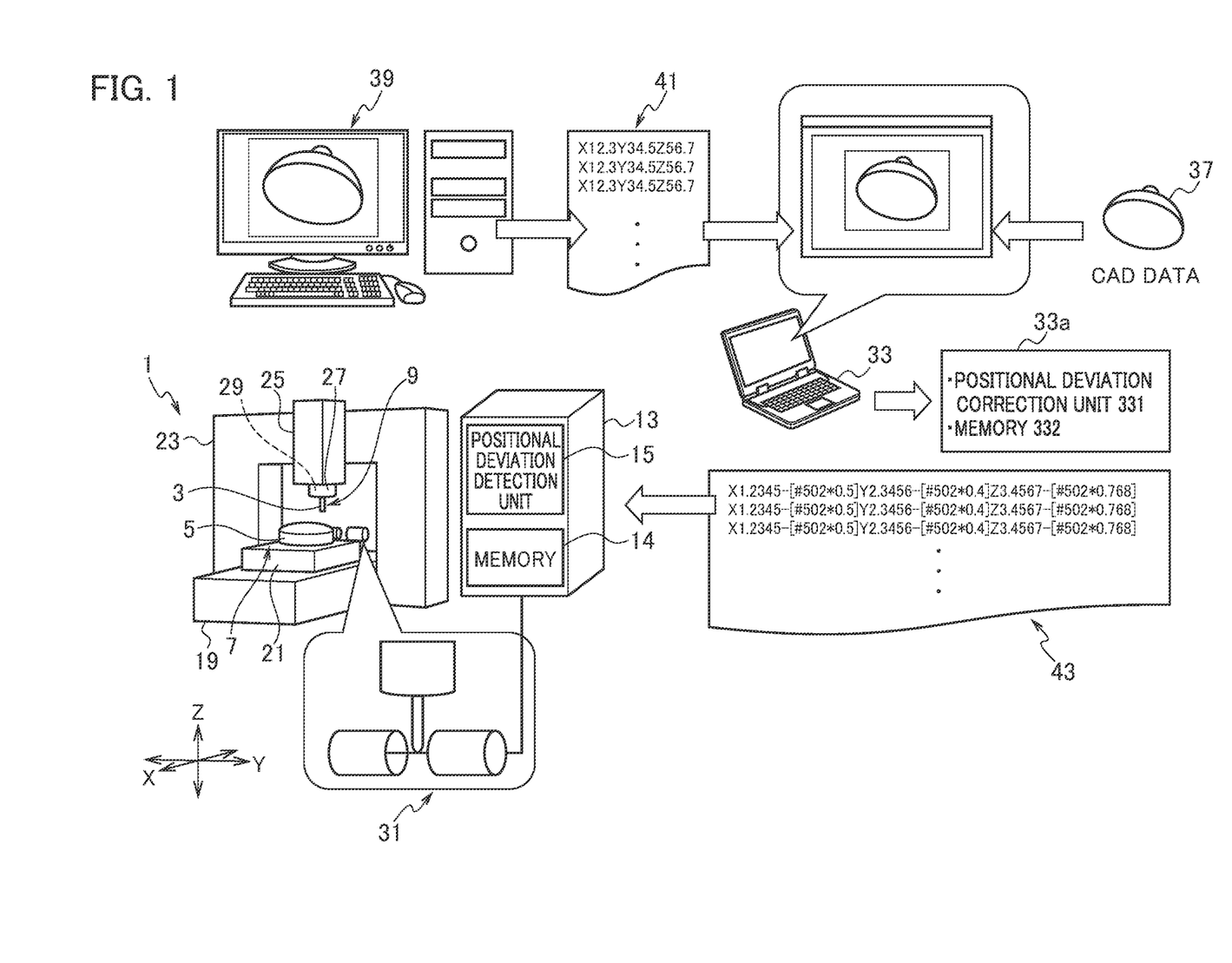
FIG. 1 is a block diagram schematically illustrating a configuration of a workpiece machining device according to an embodiment.

A workpiece machining device according to an embodiment will be described below with reference to the drawings. FIG. 1 is an explanatory diagram schematically illustrating a configuration of a workpiece machining device 1 (hereinafter simply referred to as "machining device 1") according to the embodiment. As illustrated in FIG. 1, the machining device 1 includes a bed 19 serving as a base, a table 21 provided on an upper surface of the bed 19, a column 23 disposed from a side of the bed 19 to straddle the bed 19 and formed into an inverted U-shape in a front view, and a main shaft support 25 disposed near an upper center of the column 23.

In the following description, a direction to be set on an upper surface of the bed 19 is defined as an X-axis direction (longitudinal direction), a direction orthogonal to the X-axis direction on the upper surface of the bed 19 is defined as a Y-axis direction (lateral direction), and a direction orthogonal to the upper surface of the bed 19 (that is, a normal direction) is defined as a Z-axis direction. The X, Y, and Z axes are orthogonal coordinate system.

The table 21 includes a workpiece holding unit 7. The workpiece holding unit 7 fixes a workpiece 5 to be machined by the machining device 1. The table 21 is supported on the bed 19 via a linear guide bearing (not illustrated), and is movable in the X-axis direction relative to the bed 19 by an actuator (not illustrated) such as a linear motor. That is, by controlling the table 21, the workpiece 5 can be relatively moved to a desired position on the X-axis on the bed 19.

The column 23 is formed integrally with the bed 19. A main shaft support 25 formed into a casing shape is provided in the vicinity of an upper center of the column 23. A main shaft housing 27 is provided on a lower surface of the main shaft support 25.

A spindle 29 for fixing and rotating a radius end mill 3 is provided at a proper position on a lower surface of the main shaft housing 27. As illustrated by reference numeral 3 in FIG. 2, "radius end mill" refers to a cutting tool in which a corner portion of a lower end is formed into an arc shape in a side view and which rotates around a rotation axis to perform cutting of the workpiece 5. In other words, "radius end mill" refers to a cutting tool in which the corner portion of a cutting edge is formed into an arc shape having a constant radius and a bottom portion is formed into a flat shape.

The spindle 29 is provided with a tool holding unit 9, and the tool holding unit 9 enables the radial end mill 3 to be attached and detached. In other words, a desired tool can be attached to the tool holding unit 9 according to a mode for machining the workpiece 5.

The radius end mill 3 is relatively moved to a desired position in the Z-axis direction (vertical direction) of the spindle 29. The spindle 29 is movable in the Z-axis direction. Accordingly, the radius end mill 3 can be relatively moved to a position in the Z-axis direction by controlling the spindle 29.

The main shaft housing 27 is supported by the main shaft support 25 via a linear guide bearing (not illustrated). Therefore, the radius end mill 3 can be moved in the Y-axis direction by an actuator (not illustrated) such as a linear motor. That is, the radius end mill 3 can be relatively moved to a desired position on the Y-axis by controlling the main shaft housing 27.

Thus, by controlling the movement of the table 21, the main shaft housing 27, and the spindle 29, the three-dimensional relative position of the workpiece 5 and the radius end mill 3 can be set. That is, the workpiece 5 can be cut by making the radius end mill 3 abutted on a desired machining part of the workpiece 5. The relative movement of the workpiece 5 and the radius end mill 3 is merely an example, and either of the workpiece 5 and the radius end mill 3 may be moved on each axis.

Figure 2:
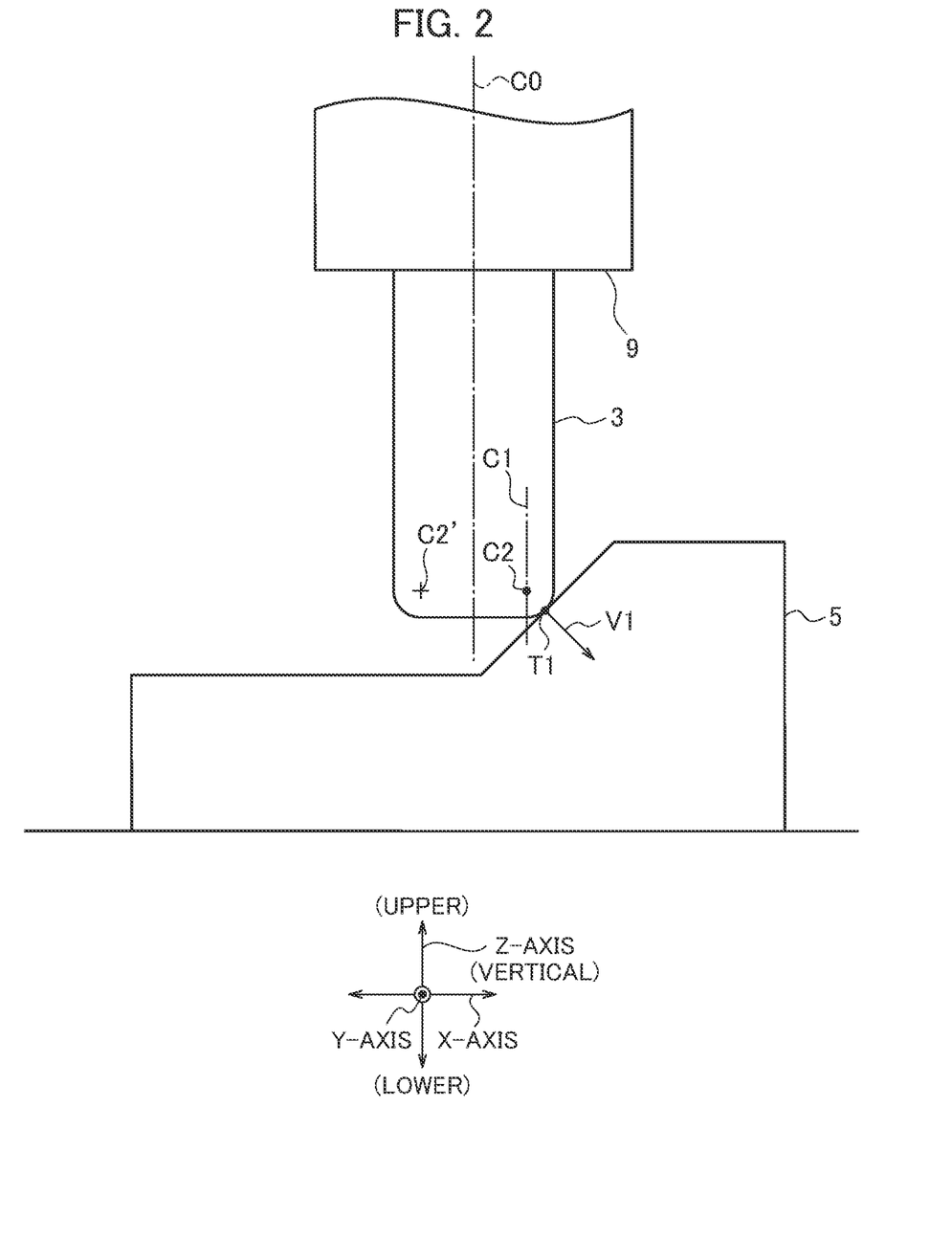
FIG. 2 is an explanatory diagram schematically illustrating a state in which a radius end mill is in contact with a workpiece at the time of cutting.

FIG. 2 is an explanatory diagram schematically illustrating a state in which the radius end mill 3 is in contact with the workpiece 5 at the time of cutting. As illustrated in FIG. 2, the radius end mill 3 has a shape in which a side view when it is rotated is line-symmetric about a center line C0. As described above, the corner portion of the radius end mill 3 is formed into an arc shape of ¼ circle, that is, of 90 degrees. A bottom of the radius end mill 3 has a straight line shape. The radius end mill 3 is provided with a cutting edge section on the outer periphery, which makes it possible to perform cutting of the workpiece 5 by the cutting edge section. A center of 90 degrees arc shape at the corner portion of the radius end mill 3 is defined as C2 and C2'.

The radius end mill 3 is fixed by chucking an upper end portion (upper end in the figure) to the tool holding unit 9.

The radius end mill 3 held by the tool holding unit 9 rotates around the center line C0 in the Z-axis direction (vertical direction) to perform cutting of the workpiece 5 with the cutting edge.

Returning to FIG. 1, the machining device 1 includes a tool shape measuring device 31 for measuring a shape of the radius end mill 3. The tool shape measuring device 31 is, for example, a laser measuring instrument, and measures the shape of the radius end mill 3 by irradiating a laser beam from the side surface direction of the radius end mill 3 and receiving the irradiated laser beam.

The machining device 1 includes a control unit 13 for comprehensively controlling the entire machining device 1 including the movement control of the table 21, the main shaft housing 27, and the spindle 29. The control unit 13 includes a positional deviation detection unit 15 for detecting a positional deviation of the radius end mill 3, and a memory 14 for storing various data such as data on the dimension and shape of the radius end mill 3.

The control unit 13 controls a movement of the table 21 fixing the workpiece 5 and a movement of the spindle 29 fixing the radius end mill 3 based on an NC program described later. In addition, the control unit 13 controls a rotation of the radius end mill 3. The control unit 13 may be configured, for example, as an integrated computer including a central processing unit (CPU) and storage means such as a RAM, a ROM, and a hard disk.

The NC program is set by CAM (computer aided manufacturing) 39 based on the CAD data 37 of the workpiece 5. In the NC program, a machining path 41 indicating three-dimensional coordinates when moving the radius end mill 3 relatively to the workpiece 5 is set. The NC program set by the CAM 39 is transmitted to the computer 33.

The positional deviation detection unit 15 calculates a contour line (a real contour line P2 described later) of the radius end mill 3 based on the shape of the radius end mill 3 measured by the tool shape measuring device 31. That is, the positional deviation detection unit 15 detects a deviation amount between the contour line (an ideal contour line P1 described later) in an ideal state of the radius end mill 3 and the real contour line P2, and stores data of the detected deviation amount in the memory 14. In addition, the positional deviation detection unit 15 transmits the data of the deviation amount to the computer 33.

The computer 33 includes a computing unit 33a. The computing unit 33a includes a positional deviation correction unit 331 and a memory 332. The positional deviation correction unit 331 performs a process for correcting the machining path 41 included in the NC program when cutting of the workpiece 5 by the radius end mill 3 is performed. The computing unit 33a acquires the NC program including the machining path 41 from the CAM 39, and further, based on an amount of deviation between the ideal contour line P1 and the real contour line P2, corrects three-dimensional coordinates of the machining path 41 using a first correction value and a second correction value calculated by processing described later. That is, the computing unit 33a corrects the NC program based on the first correction value and the second correction value. The memory 332 stores the corrected NC program including a machining path 43.

The computing unit 33a transmits the NC program including the corrected machining path 43 to the control unit 13. Therefore, the control unit 13 performs cutting of the workpiece 5 by the radius end mill 3 by using the corrected machining path 43.

Next, a correction process of the machining pass performed by the positional deviation correction unit 331 will be described. Hereinafter, the contour line in the ideal state of the radius end mill 3 will be referred to as the "ideal contour line P1" and a real contour line of the radius end mill 3 will be referred to as the "real contour line P2".

When the workpiece 5 is actually machined using the radius end mill 3, as described above, a mounting error occurs when the radius end mill 3 is fixed to the spindle 29, and a shape error exists in the radius end mill 3. Therefore, the ideal contour line P1 and the real contour line P2 are not identical to each other, and a positional deviation occurs. The presence of the positional deviation causes an error in the cutting position of the workpiece 5, thereby reducing machining accuracy. In the embodiment, a process for correcting the positional deviation generated in the radius end mill 3 is performed. Hereinafter, the process for correcting the positional deviation generated in the radius end mill 3 will be described in detail.

[Description of Process for Correcting Positional Deviation]

Figure 3:
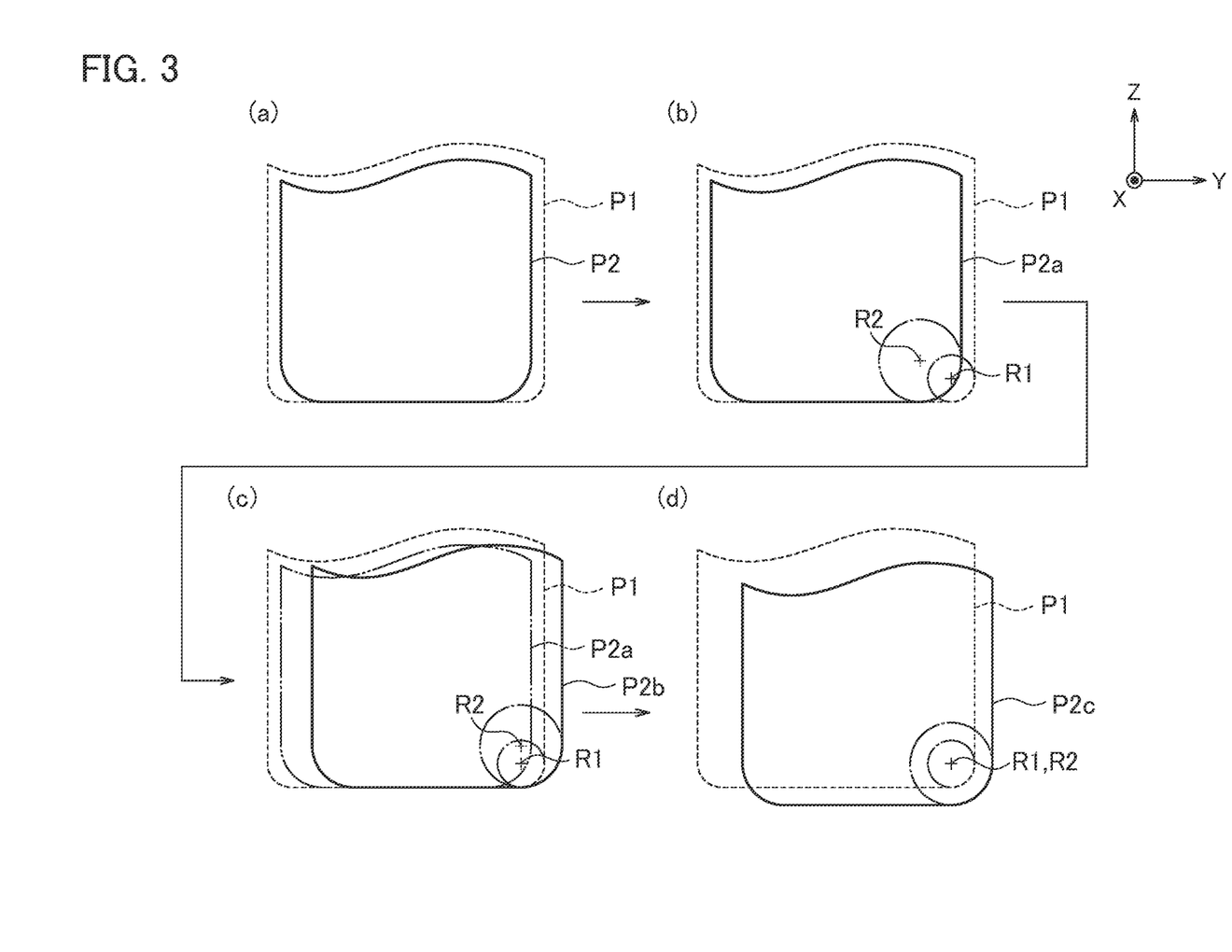
FIG. 3 is explanatory diagrams illustrating positional relationships between an ideal contour line and a real contour line of the radius end mill, where (a) illustrates an initial position, (b) illustrates arc shapes at a corner portion, (c) illustrates a state in which arc centers are identical to each other in the X-Y plane direction, and (d) illustrates a state in which two arc centers R1 and R2 are identical to each other.

In FIG. 3, (a) is an explanatory diagram illustrating a shape (ideal shape) of the radius end mill 3 and a shape (real shape) of the real radius end mill 3. Reference numeral P1 illustrated in (a) of FIG. 3 denotes a contour line formed into an ideal shape, that is, the ideal contour line P1. Reference numeral P2 denotes a contour line of a real shape, that is, the real contour line P2. As described above, there is a positional deviation between the ideal contour line P1 and the real contour line P2 due to a mounting error and a shape error. Therefore, the ideal contour line P1 and the real contour line P2 are not identical to each other.

In order to correct an error of a cutting position caused by the positional deviation, the positional deviation correction unit 331 corrects the above mounting error by performing a first correction process described below, and corrects the above shape error by performing a second correction process.

(First Correction Process)

Correction is performed to make the positions of an arc center at a corner portion in the ideal contour line P1 (this is defined as "arc center R1") and an arc center at a corner portion in the real contour line P2 (this is defined as "arc center R2") in the X-Y plane direction to be identical to each other. Further, if necessary, process is performed to make the positions of the arc center R1 at the corner portion in the ideal contour line P1 and the arc center R2 at the corner portion in the contour line P2 in the Z-axis direction to be identical to each other.

(Second Correction Process)

A difference between an arc (an arc of ¼ circle) of the ideal contour line P1 and an arc (an arc of ¼ circle) of the real contour line P2 is calculated around the arc center R1 at the corner portion in the ideal contour line P1, and a process for correcting the difference is performed.

As an initial process for performing the first correction process and the second correction process, a real shape of the radius end mill 3 is measured by using the tool shape measuring device 31 (see FIG. 1). Herein, an example in which a laser measuring instrument is used as the tool shape measuring device 31 will be described. The laser measuring instrument measures a shape of the radius end mill 3 by irradiating a laser beam from the side surface direction of the radius end mill 3 and receiving the irradiated laser beam. As a result, as illustrated in (a) of FIG. 3, the real contour line P2 of the radius end mill 3 is acquired. Further, the data of the ideal contour line P1 illustrated in (a) of FIG. 3 is stored in advance in the memory 14. In (a) of FIG. 3, a deviation amount between the two contour lines P1 and P2 is exaggerated.

Thereafter, the first correction process is performed. Specifically, as illustrated in (b) of FIG. 3, the positions of the arc center R1 of the arc (first arc section) at the corner portion of the ideal contour line P1 and the arc center R2 of the arc (second arc section) at the corner portion of the real contour line P2 are calculated.

As described above, since the data of the ideal contour line P1 is stored in the memory 14, the arc center R1 can be calculated based on the data of the ideal contour line P1. On the other hand, the arc center R2 can be calculated based on the data of the real contour line P2 measured by the laser measuring instrument, for example, by using a method such as a least squares method. In FIG. 3, (b) illustrates an example in which a radius of curvature at the corner portion of the ideal contour line P1 differs from a radius of curvature at the corner portion of the real contour line P2.

Then, the deviation amount between the arc center R1 and the arc center R2 in the X-Y plane direction, that is, the horizontal distance between R1 and R2 illustrated in (b) of FIG. 3 is stored in the memory 14. By decomposing and correcting the deviation amount into a component in the X-axis direction and the Y-axis direction, as illustrated in (c) of FIG. 3, the real contour line P2a before correction can be moved to the real contour line P2b after correction, and the positional deviation between the arc center R1 and the arc center R2 in the X-Y plane direction is corrected. In (c) of FIG. 3, the positions of the arc center R1 and the arc center R2 in the X-Y plane direction are identical to each other.

Further, the deviation amount in the vertical direction (Z-axis direction) between the arc center R1 and the arc center R2 is calculated, and the deviation amount is stored in the memory 14. By correcting the deviation amount between the arc center R1 and the arc center R2 in the vertical direction, the real contour line P2b can be moved to the real contour line P2c as illustrated in (d) of FIG. 3, and the coordinates of the arc center R1 and the arc center R2 in the vertical direction are corrected. That is, the mounting error is corrected. A correction value of the deviation amount in the X-Y plane direction at this time is stored as a reference code #591 in the memory 332 illustrated in FIG. 1. In addition, a correction value of the deviation amount in the Z-axis direction (vertical component) is stored as a reference code #592.

Next, the second correction process is performed. That is, after the three-dimensional coordinates of the arc center R1 and the arc center R2 are corrected so as to be identical to each other in the first correction process, and the three-dimensional machining points of the radius end mill 3 are corrected in order to correct a shape error of the radius end mill 3. Hereinafter, the correction of the three-dimensional machining points of the radius end mill 3 will be described in detail.

The positional correction of the radius end mill 3 is performed based on a unit normal vector V1 with respect to the machining surface at a machining point T1 (described later in detail with reference to FIG. 5) of the radius end mill 3 and the shape error of the radius end mill 3. Thus, the three-dimensional position of the radius end mill 3 can be corrected in at least one of the X-axis direction, the Y-axis direction, and the Z-axis direction. The directions of the X, Y, and Z axes are determined by the unit normal vector V1.

Figure 4:
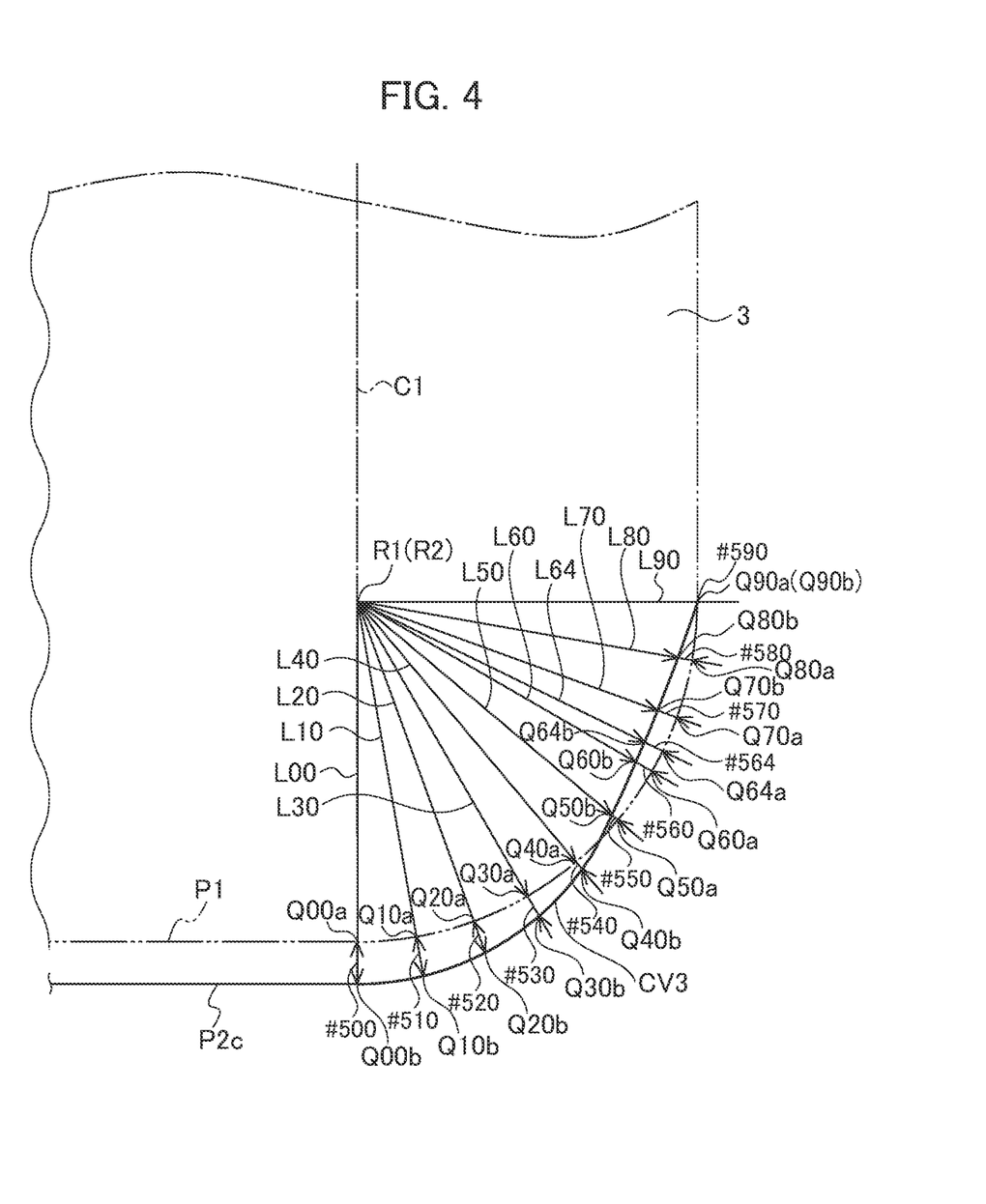
FIG. 4 is an explanatory diagram illustrating shape errors of the arc shapes at the corner portion between the ideal contour line and the real contour line of the radius end mill.

FIG. 4 is an explanatory diagram illustrating a relationship between the angles of the arc (0 degree to 90 degrees) at the corner portion of the radius end mill 3 and the correction values for correcting the shape error. FIG. 4 illustrates the ideal contour line P1 at the corner portion of the radius end mill 3, and the real contour line P2c after the arc center R1 and the arc center R2 are identical to each other.

In FIG. 4, the vertical direction (Z-axis direction) is set at an angle of 0 degree, and the horizontal direction is set at an angle of 90 degrees. As an example, FIG. 4 illustrates a shape in which the real contour line P2c protrudes outward of the ideal contour line P1 in a range of 0 degree to 45 degrees with respect to the arc center R1, and the real contour line P2c is more recessed than the ideal contour line P1 in a range of 45 degrees to 90 degrees.

As described above, the corner portion at a tip of the radius end mill 3 is formed into an arc shape of ¼ circle, that is, of 90 degrees. Then, an arc center of the 90 degrees arc in the ideal contour line P1 is defined as R1, and a line passing through the arc center R1 and parallel to the center line C0 (see FIG. 2) is defined as an "axial direction line C1". The arc center R1 illustrated in FIG. 4 is the arc center R1 of the ideal contour line P1 illustrated in (d) of FIG. 3. Further, since the three-dimensional coordinates of the arc center R1 of the ideal contour line P1 and the arc center R2 of the real contour line P2c are corrected to be identical to each other by the first correction process described above, the arc center R1 and the arc center R2 in FIG. 4 are identical to each other.

Then, as illustrated in FIG. 4, ten straight lines L00 to L90 extending from the arc center R1 toward the outer shape of the 90 degrees arc of the radius end mill 3 are set at 10 degrees intervals. Specifically, an intersection angle between the axial direction line C1 of the radius end mill 3 and the straight line L00 is 0 degree. That is, the straight line L00 and the axial direction line C1 are parallel to each other (collinear).

An intersection angle between the axial direction line C1 and the straight line L10 is 10 degrees. Similarly, an intersection angle between the axial direction line C1 and the lines L20 to L90 is 20 degrees to 90 degrees. That is, the direction parallel to the axial direction line C1 is 0 degree, the direction orthogonal to the axial direction line C1 is 90 degrees, and respective straight lines are set for each angular direction of 10 degree.

Here, an intersection point between the straight line L00 and the ideal contour line P1 is defined as an intersection point Q00a. Similarly, the intersection points of the respective straight lines L10, L20, . . . , and, L90 and the ideal contour line P1 are defined as intersections Q10a, Q20a, . . . , and, Q90a, respectively. Meanwhile, the intersection points of the respective straight lines L00, L10, L20, . . . , and, L90 and the real contour line P2c are defined as intersections Q00b, Q10b, Q20b, . . . , and, Q90b, respectively. Therefore, since a distance (that is, a difference) between the two intersections in each straight line is a shape error, this value is set as a correction value (second correction value) in the second correction process. For example, in the straight line L10, "Q10b–Q10a" is set as the second correction value.

Thereafter, the second correction values in the respective angular directions are stored as reference codes #500, #510, . . . , and, #590 in the memory 14 of the control unit 13 illustrated in FIG. 1. Specifically, "#500=Q00b–Q00a", "#510=Q10b–Q10a", and, "#590=Q90b–Q90a" are stored.

Although FIG. 4 illustrates an example in which the second correction value is calculated in the respective straight lines L00, L10, . . . , and L90 at intervals of 10 degrees in order to avoid complication, in fact, the second correction value is set to finer angle intervals (for example, every 1 degree). Therefore, the second correction value for each 1 degree angle interval is stored in the memory 14 as reference codes #500, #501, #502, . . . , #589, and #590.

In summarizing the above description, when a mounting error occurs in the radius end mill 3, the first correction process is performed such that the arc centers R1 and R2 are identical to each other. Specifically, as described in (a) to (d) of FIG. 3, in order to make the positions of the arc center R1 at the corner portion of the ideal contour line P1 and the arc center R2 at the corner portion of the real contour line P2 in the horizontal direction (X-Y plane direction) to be identical to each other and in order to make the positions in the vertical direction (Z-axis direction) to be identical to each other, a mounting error, which is a deviation amount, is calculated. The components of the correction value (first correction value) of the calculated mounting error in the X-Y plane are stored in the memory 14 as reference code #591, and the components in the vertical direction are stored as reference code #592.

The first correction value is used to perform correction such that the positions of the two arc centers R1 and R2 in the X-Y plane are identical to each other. Specifically, the amount of deviation in the X-Y plane is decomposed into an X-axis component and a Y-axis component to calculate a correction value in the X-axis direction and a correction value in the Y-axis direction. Further, a correction value in the Z-axis direction is calculated. The arc center R2 is corrected by the correction values (first correction values) in the respective directions. As a result, the positions of the arc center R1 and the arc center R2 in the X-Y plane direction and in the Z axis direction are identical to each other.

Thereafter, the straight lines L00 to L90 are drawn from the arc center R1 of the ideal contour line P1 illustrated in FIG. 4 at every angle of 1 degree, and the second correction value is calculated on each straight line. That is, the second correction process is performed. The calculated second correction values are stored in the memory 14 as the reference codes #500 to #590.

The three-dimensional coordinates of the NC program are corrected by using the reference codes #591 and #592 calculated by the first correction process and the reference codes #500 to #590 calculated by the second correction process. As a result, the mounting error and the shape error between the ideal contour line P1 and the real contour line P2c can be corrected.

Next, processing for correcting the three-dimensional coordinates of the machining path included in the NC program using the first correction value and the second correction value will be described.

[Description of Three-Dimensional Coordinate Correction]

First, the unit normal vector V1 at a desired machining point (defined as T1) of the workpiece 5 is calculated based on the CAD data (data illustrating the shape of the workpiece 5 as a finished product) 37 illustrated in FIG. 1 and the NC program created in the CAM 39, that is, the NC program for machining the workpiece with the radius end mill 3 formed into ideal shape. This is performed by the computing unit 33a of the computer 33.

Figure 5:
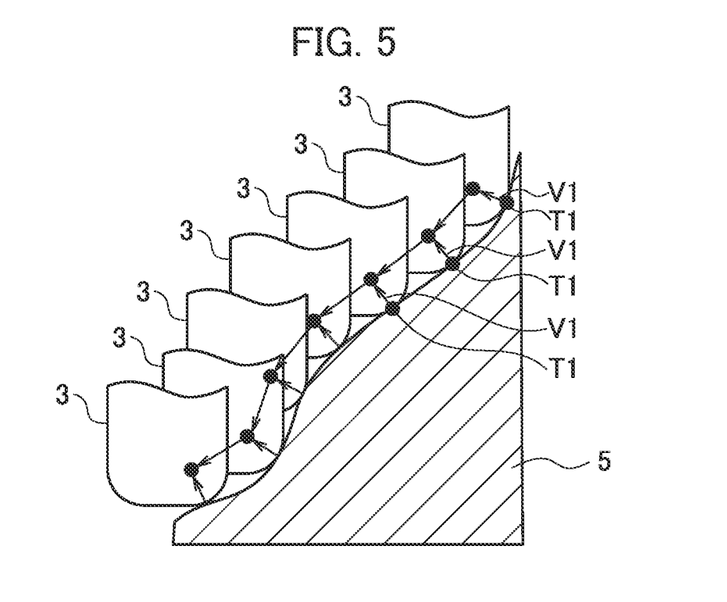
FIG. 5 is an explanatory diagram illustrating machining points and unit normal vectors when the workpiece is machined with the radius end mill.

FIG. 5 is an explanatory diagram illustrating a movement of the radius end mill 3 according to the machining path when the workpiece 5 is machined by the radius end mill 3. As illustrated in FIG. 5, when the workpiece 5 is cut by the radius end mill 3, a point where the radius end mill 3 contacts the workpiece 5 is the machining point T1. A unit normal vector (defined as V1) at the machining point T1 is calculated. This processing is performed, for example, by the computer 33. The three-dimensional coordinates of the machining point T1 can be acquired from the NC program or by actually moving the ideal radius end mill along the machining path when the ideal radius end mill is mounted.

Further, when the workpiece 5 is cut by using the radius end mill 3, the radius end mill 3 moves in at least one of the X-axis, Y-axis, and Z-axis directions with respect to the workpiece 5. That is, the three-dimensional position of the machining point T1 changes as the cutting proceeds.

A surface of the workpiece 5 around the machining point T1 is flat or curved. However, when the surface is limited to an extremely minute region, this region can be regarded as a plane even if it is a curved surface.

The unit normal vector V1 is a vector orthogonal to the above-described minute region (plane) and has a component in each direction of the X axis, the Y axis, and the Z axis. The scalar quantity of the unit normal vector V1 is "1". In other words, when respective numerical values which are the components of the unit normal vector V1 in the X, Y, and Z directions are squared and added and the square root (root) thereof is calculated, the solution is "1".

In the embodiment, the correction values (the difference between the ideal contour line P1 and the real contour line P2) stored as the above reference codes #500, #501, ..., #589, and #590 are set as the deviation amounts in the respective angular directions. Then, the unit normal vector V1 is vectorially decomposed into a component in the three-dimensional directions of the X axis, the Y axis, and the Z axis, and a deviation amount in each direction is calculated. Hereinafter, a specific description will be given with reference to the arithmetic expressions illustrated in FIGS. 6 and 7.

Figure 6:
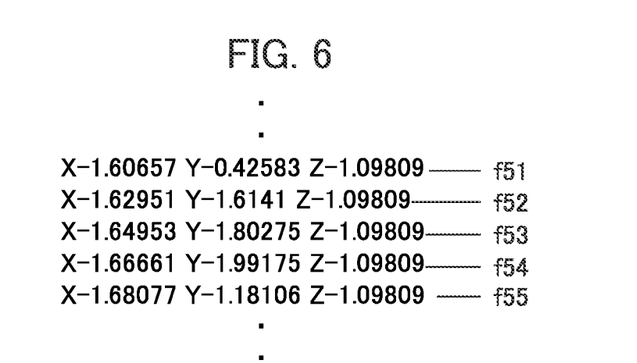
FIG. 6 is a diagram illustrating coordinates of the machining points of the workpiece by the radius end mill set in an NC program.

FIG. 6 illustrates three-dimensional coordinates when a cutting position by the radius end mill 3 moves in the order of the machining points f51→f52→f53→f54→f55. The three-dimensional coordinates indicate coordinates when the radius end mill 3 is formed into an ideal shape. That is, the three-dimensional coordinates of the machining path initially set in the NC program are illustrated.

Figure 7:
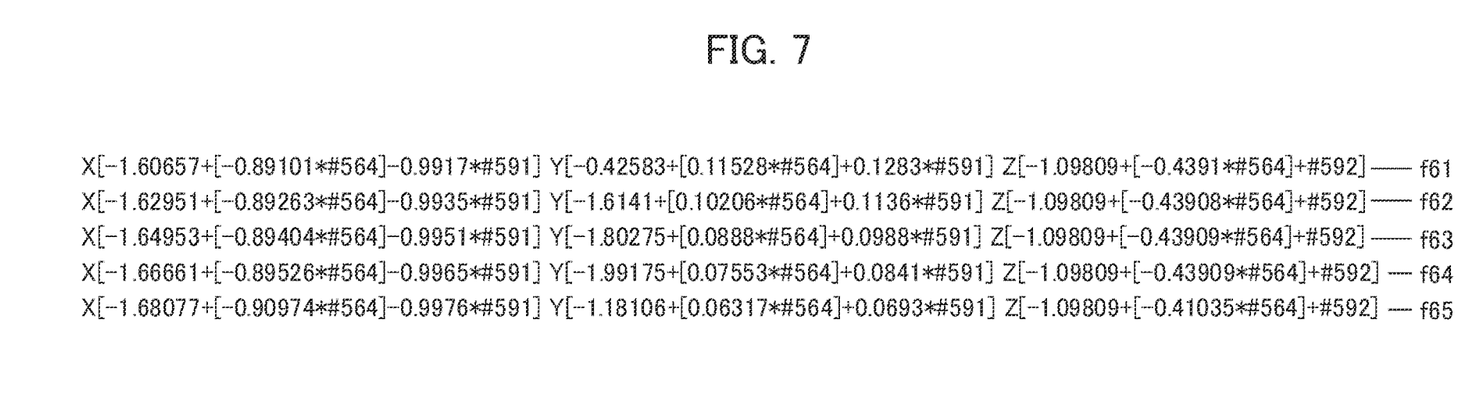
FIG. 7 is a diagram illustrating arithmetic expressions for correcting the coordinates of the machining points illustrated in FIG. 6.

In the embodiment, the three-dimensional coordinates of the machining pass are corrected based on the unit normal vector V1 and the respective reference codes described above. Specifically, the coordinates of the respective machining points f51, f52, f53, f54, and f55 illustrated in FIG. 6 are corrected to the coordinates of the respective machining points f61, f62, f63, f64, and f65 illustrated in FIG. 7. That is, the arithmetic expressions illustrated in FIG. 7 are stored in the memory 332, and the coordinates of the machining points are corrected by the arithmetic expressions.

Specifically, for example, the three-dimensional coordinates at the machining point f51 illustrated in FIG. 6 are X=−1.60657, Y=−0.42583, and Z=−1.09809. On the other hand, when the real contour line P2 is deviated from the ideal contour line P1, the coordinates are corrected to the machining point f61 illustrated in FIG. 7.

The machining points f51 and f61 are machining points at which an angle of the machining position by the radius end mill 3 illustrated in FIG. 4 is 64 degrees. Therefore, the second correction value stored as the reference code #564 is read from the memory 14, and the second correction value is decomposed in each direction of the X axis, the Y axis, and the Z axis based on the unit normal vector, thereby calculating the correction value in each axial direction. The three-dimensional coordinates of the machining point f51 before correction are corrected by the correction value, and the three-dimensional coordinates of the machining point f61 illustrated in FIG. 7 are calculated.

Hereinafter, the arithmetic expression of the machining point f61 illustrated in FIG. 7 will be described in more detail. By decomposing the unit normal vector V1 at the machining point f61 into a component of the X axis, the Y axis, and the Z axis, for example, (X, Y, Z)=(−0.89101, 0.11528, −0.4391) is acquired. Since an angle of the machining point is 64 degrees, the second correction value stored as the reference code #564 is adopted.

That is, [−0.89101*#564], which is a correction value of the X coordinate illustrated by "f61" in FIG. 7, is a numerical value acquired by multiplying the second correction value set as the reference code #564 by "−0.89101" which is a component in the X axis direction of the unit normal vector V1. In addition, [0.11528*#564], which is a correction value of the Y coordinate, is a numerical value acquired by multiplying the second correction value set as the reference code #564 by "0.11528" which is a component in the Y-axis direction of the unit normal vector V1. In addition, [−0.4391*#564], which is a correction value of the Z coordinate, is a numerical value acquired by multiplying the second correction value set as the reference code #564 by "−0.4391" which is a component in the Z axis direction of the unit normal vector V1.

Further, in "f61" of FIG. 7, "−0.9917*#591", which is a component in the X-axis direction of the reference code #591 indicating the first correction value, is added to the X-coordinate, and "0.1283*#591", which is a component in the Y-axis direction of the reference code #591 indicating the first correction value, is added to the Y-coordinate. In addition, the reference code #592 indicating the first correction value is added to the Z coordinate. That is, the deviation amount on the X-Y plane calculated in the first correction process is decomposed into a component in the X-axis direction and a component in the Y-axis direction and added to the respective coordinates. In addition, the value of #592 is added to a component in the Z-axis direction. "−0.9917" described above is an example of the component in the X-axis direction, and "0.1283" described above is an example of the component in the Y-axis direction. The components in the X-axis direction and the Y-axis direction are determined by a horizontal component unit vector of the normal vector of the work surface at the machining point.

Therefore, the three-dimensional coordinates illustrated at the machining point f61 in FIG. 7 are coordinates reflecting the first correction value calculated in the first correction process and the second correction value calculated in the second correction process. By driving the radius end mill 3 based on the coordinates, even when a shape error occurs between the ideal contour line P1 and the real contour line P2, the influence of the error can be avoided to perform cutting with high accuracy. That is, by correcting the three-dimensional coordinates of the machining point f51 illustrated in FIG. 6 to the three-dimensional coordinates of the machining point f61 illustrated in FIG. 7, it is possible to perform cutting of the workpiece 5 by bringing a desired portion of the radius end mill 3 into contact with the machining point of the workpiece 5.

Further, the memory 332 mounted in the computing unit 33a of the computer 33 stores arithmetic expressions for correcting the machining points based on the first correction values and the second correction values. Thereafter, the positional deviation correction unit 331 corrects the machining points by the radius end mill 3 by using the arithmetic expressions, which makes it possible to reduce the arithmetic burden at the time of machining.

In the embodiment, (d) of FIG. 3 illustrates an example that the three-dimensional coordinates of the arc center R1 of the ideal contour line P1 and the arc center R2 of the real contour line P2 are identical to each other. That is, by the first correction process, the Z-axis coordinates of the arc center R1 and the arc center R2 are made to be identical to each other. However, a deviation in the Z-axis direction often does not cause a large problem in machining the workpiece 5. That is, when a deviation occurs in the Z-axis direction (the direction of the axial direction line C1 illustrated in FIG. 4), the machining point of the workpiece 5 is entirely deviated in the Z-axis direction due to the deviation, but this deviation does not necessarily need to be corrected.

That is, a relative deviation of the shape of the workpiece 5 in the Z-axis direction does not often cause a large problem in machining the workpiece 5. Therefore, as illustrated in (c) of FIG. 3, correction may be performed to make the arc center R1 and the arc center R2 to be identical to each other in the X-Y plane direction, and the second correction may be performed in a state where a deviation in the Z-axis direction occurs. That is, in the first correction process, the first correction may be performed to make the arc center R1 and the arc center R2 to be identical to each other in the X-Y plane direction, and in a state where a deviation in the Z-axis direction occurs in the second correction process, that is, the second correction may be performed in a state where the arc center R1 and the arc center R2 illustrated in FIG. 4 are not identical to each other.

That is, in the first correction process, the respective centers of the first arc section formed into an arc shape at the corner portion of the ideal contour line P1 and the second arc section formed into an arc shape at the corner portion of the real contour line P2 are made to be identical to each other in a plane (X-Y plane) orthogonal to the rotation axis (center line C0 illustrated in FIG. 2).

[Description of Processing Operation of Embodiment]

Figure 8:
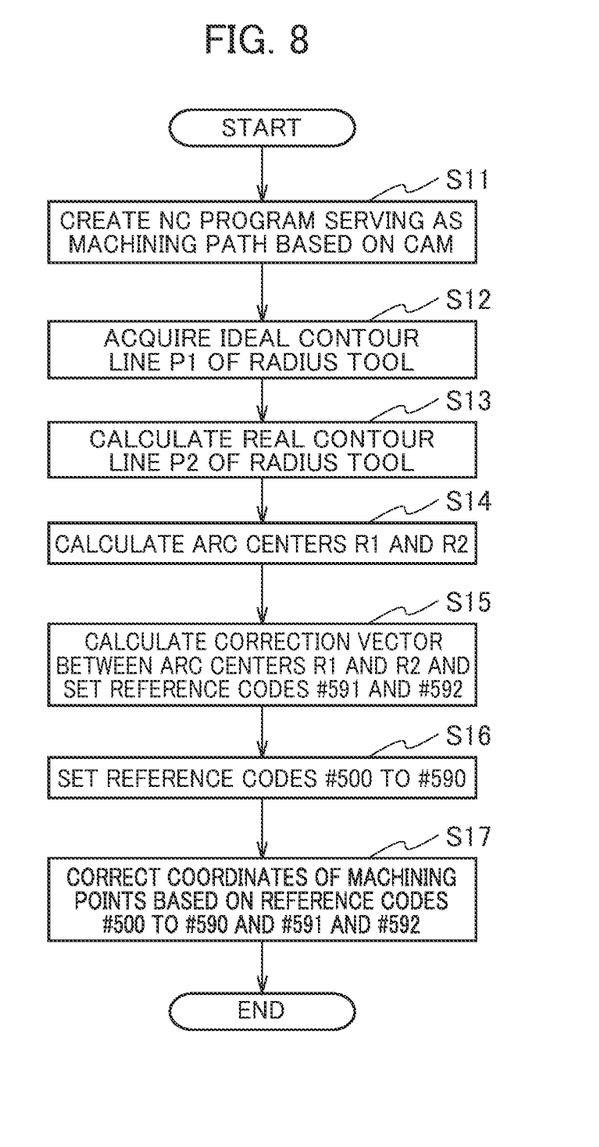
FIG. 8 is a flow chart illustrating a procedure for correcting the machining points by the radius end mill.

Next, a processing procedure for correcting the machining points by the radius end mill 3 by performing the computer program according to the embodiment will be described with reference to the flowchart illustrated in FIG. 8. The process illustrated in FIG. 8 is performed by the computer 33 illustrated in FIG. 1. The process illustrated below is stored as a computer program in the memory 332 (see FIG. 1) of the computer 33.

First, in step S11 illustrated in FIG. 8, an NC program serving as a machining path for the radius end mill 3 is created by the CAM 39 illustrated in FIG. 1. The machining path at this time is a machining pass (machining path 41 illustrated in FIG. 1) in the case where the radius end mill 3 is accurately mounted to the spindle 29 of the tool holding unit 9 and where there is no shape error in the radius end mill 3.

In step S12, the positional deviation detection unit 15 of the control unit 13 acquires the ideal contour line P1 of the radius end mill 3. The data of the ideal contour line P1 is stored in the memory 14. That is, the memory 14 stores the data of the dimension and shape of the radius end mill 3, which makes it possible to acquire the data of the ideal contour line P1 from the data of the dimension and shape of the radius end mill 3.

In step S13, the positional deviation detection unit 15 calculates the real contour line P2 of the radius end mill 3. More specifically, a laser measuring instrument (a tool shape measuring device 31 illustrated in FIG. 1) irradiates a laser beam from the side surface direction of the radius end mill 3 and detects the laser beam passing through the radius end mill 3 to calculate the real contour line P2.

In step S14, the positional deviation detection unit 15 calculates the arc center R1 at the corner portion of the ideal contour line P1 and the arc center R2 at the corner portion of the real contour line P2. The arc center R1 can be acquired from the data of the ideal contour line P1 stored in the memory 14. Further, the arc center R2 can be calculated by using a method such as a least squares method based on the data of the real contour line P2.

In step S15, the positional deviation correction unit 331 of the computer 33 calculates a mounting error which is a deviation amount between the two arc centers R1 and R2. Specifically, the amount of deviation between the arc center R1 and the arc center R2 in the X-Y plane direction is calculated. Further, a deviation amount between the arc center R1 and the arc center R2 in the Z-axis direction is calculated. A correction value for correcting the deviation amount between the arc center R1 and the arc center R2 in the X-Y plane direction is set to the reference code #591 of the memory 332. In addition, a correction value for correcting the deviation amount between the arc center R1 and the arc center R2 in the Z-axis direction is set to the reference code #592.

In step S16, the positional deviation correction unit 331 calculates second correction values for respective angular directions of the arc at the corner portion of the radius end mill 3 based on the ideal contour line P1 and the real contour line P2c after making the arc center R1 and the arc center R2 to be identical to each other, and sets the calculated second correction values to the respective reference codes #500 to #590.

In step S17, the positional deviation correction unit 331 performs correction to make the three-dimensional coordinates of the arc center R1 of the ideal contour line P1 and the arc center R2 of the real contour line P2 to be identical to each other by the first correction values set to the reference codes #591 and #592.

The positional deviation correction unit 331 further calculates the unit normal vector V1 at the machining point T1 of the workpiece 5 by the radius end mill 3, and further corrects the coordinates of the machining points in the respective directions of the X axis, the Y axis, and the Z axis by using the reference codes. More specifically, the second correction value set to, for example, the reference code #564 is acquired based on the angular direction (angle of 0 degree to 90 degrees) of the machining point T1 by the radius end mill 3. Further, the unit normal vector V1 is decomposed into a component in the X-axis direction, the Y-axis direction, and the Z-axis direction, and the coordinates of the machining points in the X-axis direction, the Y-axis direction, and the Z-axis direction are corrected by multiplying the second correction values.

As a result, the three-dimensional coordinates of the machining points illustrated in FIG. 6 can be corrected to the three-dimensional coordinates illustrated in FIG. 7. Then, the control unit 13 performs machining of the workpiece 5 by the radius end mill 3 based on the machining path of the corrected three-dimensional coordinates, thereby making it possible to process the workpiece 5 with high accuracy.

[Description of Effects of Embodiment]

In the workpiece machining device 1 for machining a workpiece by performing the computer program according to the embodiment in this way, firstly, the first correction value is calculated. More specifically, in the case where a deviation is generated between the ideal contour line P1 and the real contour line P2 of the radius end mill 3 when the workpiece 5 is machined by using the radius end mill 3, a mounting error, which is a deviation amount between the arc center R1 at the corner portion of the ideal contour line P1 and the arc center R2 at the corner portion of the real contour line P2, is calculated. The first correction value, which is a correction value for correcting the mounting error, is calculated. Then, based on the first correction value, correction is performed to make the coordinates of the arc center R1 and the arc center R2 in the X-Y plane direction to be identical to each other. Further, correction is performed to make the coordinates of the arc center R1 and the arc center R2 in the Z-axis direction to be identical to each other.

Further, the second correction value, which is a correction value for correcting the deviation amount in each angular direction (0 degree to 90 degrees), is calculated, and the three-dimensional coordinates of the machining point of the radius end mill 3 are corrected based on the second correction value. Therefore, even when a mounting error in mounting the radius end mill 3 to the spindle 29 or a shape error exists in the radius end mill 3, the machining path by the radius end mill 3 is corrected so as to eliminate these errors, thereby making it possible to process the workpiece 5 with high accuracy.

Further, as illustrated in FIG. 7, the arithmetic expressions of the corrected machining path are stored in the memory 332 of the computer 33. The three-dimensional coordinates are corrected by substituting the reference codes #500 to #590 and the reference codes #591 and #592 in the arithmetic expressions, thereby making it possible to reduce the arithmetic burden at the time of machining. This makes it possible to shorten the time required for machining the workpiece 5.

Further, the unit normal vector of the workpiece 5 by the radius end mill 3 is calculated, the correction value is calculated by vectorially decomposing the second correction value in the three-dimensional direction of the unit normal vector, and the three-dimensional coordinates of the machining point by the radius end mill 3 are corrected, thereby making it possible to improve accuracy of correction.

Figure 9:
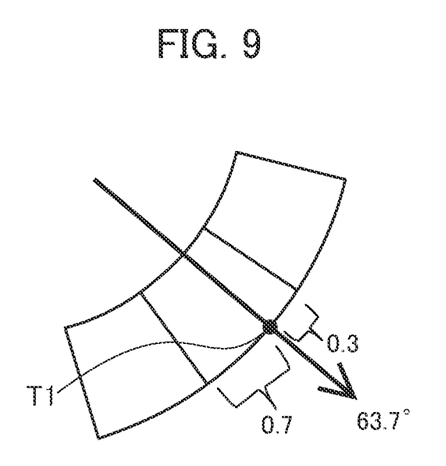
FIG. 9 is an explanatory diagram illustrating a proportional distribution of correction values in adjacent angular directions.

It should be noted that, in the above-described embodiment, the second correction value is calculated for every 1 degree of the arc-shaped region at the corner portion of the radius end mill 3 within a range of 0 degree to 90 degrees, but in the case of an angle of 63.7 degrees, for example, as illustrated in FIG. 9, the second correction value may be acquired by proportionally distributing the reference code #563 of 63 degrees and the reference code #564 of 64 degrees, which are close to the angle of 63.7 degrees, by 3 to 7. This method makes it possible to perform correction process of the machining point with higher accuracy.

Although the embodiment of the present invention have been described above, it should not be understood that the statements and drawings which form part of this disclosure are intended to limit the present invention. Various alternative embodiments, examples and operating techniques will become apparent to those skilled in the art from this disclosure.

What is claimed is:

1. A workpiece machining method for machining a workpiece into a desired shape, comprising:
    holding a radius end mill in a tool holding unit, the radius end mill having a corner portion at a lower end formed into an arc shape in a side view and rotating about a rotation axis to perform cutting of the workpiece;
    detecting a positional deviation between a real contour line, which is a contour line of the radius end mill, and an ideal contour line, which is a contour line of the radius end mill formed into an ideal shape, when the radius end mill is held by the tool holding unit;
    calculating a first correction value configured to make a center of a first arc section formed into an arc shape at a corner portion of the ideal contour line and a center of a second arc section formed into an arc shape at a corner portion of the real contour line to be identical to each other in a plane perpendicular to the rotational axis; and
    correcting a machining point by the radial end mill using the first correction value when the cutting is performed.

2. The workpiece machining method of claim 1, further comprising:
    correcting the machining point by the radial end mill using the first correction value that is a correction value configured to make positions of the center of the first arc section and the center of the second arc section in a direction of the rotational axis to be identical to each other in addition to a position on the plane perpendicular to the rotational axis.

3. The workpiece machining method of claim 1, further comprising:
    calculating a second correction value configured to correct a positional deviation between the first arc section and the second arc section in a plurality of angular directions, with respect to the center of the first arc section, of the first arc section and the second arc section where the respective centers are identical to each other in the plane perpendicular to the rotational axis; and
    correcting a machining point by the radius end mill using the second correction value in addition to the first correction value at the time of the cutting.

4. The workpiece machining method of claim 3, further comprising:
    calculating a unit normal vector of the machining point of the workpiece by the radius end mill;

decomposing the unit normal vector into components in each direction of an X-axis, a Y-axis, and a Z-axis which are orthogonal coordinate systems; and correcting coordinates in each direction of the X axis, the Y axis, and the Z axis using correction values acquired by multiplying the components in each of the axis directions by the second correction value.

5. The workpiece machining method of claim 4, further comprising calculating the second correction value, when a position of the machining point is not identical to any of the plurality of angular directions, by proportionally distributing the second correction value in two angular directions adjacent to the position of the machining point.

6. A workpiece machining device for machining a workpiece into a desired shape, comprising:

a radius end mill in which a corner portion of a lower end is formed into an arc shape in a side view and rotates about a rotation axis to perform cutting of the workpiece;

a tool holding unit configured to hold the radius end mill;

a positional deviation detection unit configured to detect a positional deviation between a real contour line, which is a contour line of the radius end mill, and an ideal contour line, which is a contour line of the radius end mill formed into an ideal shape, when the radius end mill is held by the tool holding unit; and a positional deviation correction unit configured to correct the positional deviation; wherein the positional deviation correction unit calculates a first correction value configured to make a center of a first arc section formed into an arc shape at a corner portion of the ideal contour line and a center of a second arc section formed into an arc shape at a corner portion of the real contour line to be identical to each other in a plane perpendicular to the rotational axis, and corrects a machining point by the radius end mill using the first correction value.

\* \* \* \* \*